US012654314B2

(12) United States Patent     (10) Patent No.:   US 12,654,314 B2

Maruno et al.      (45) Date of Patent:    Jun. 16, 2026

(54) ROBOT CONTROL IN WORKING SPACE

(71) Applicant: KABUSHIKI KAISHA YASKAWA DENKI, Kitakyushu (JP)

(72) Inventors: Motoharu Maruno, Fukuoka (JP); Takahiro Maeda, Fukuoka (JP); Yuta Arita, Fukuoka (JP)

( * ) Notice: Subject to any disclaimer, the term of this patent is extended or adjusted under 35 U.S.C. 154(b) by 200 days.

(21) Appl. No.: 18/178,533

(22) Filed: Mar. 6, 2023

(65) Prior Publication Data

US 2023/0286143 A1     Sep. 14, 2023

(30) Foreign Application Priority Data

Mar. 8, 2022    (JP) ................................. 2022-035461

(51) Int. Cl.
     *B25J 9/16*         (2006.01)

(52) U.S. Cl.
     CPC .............. *B25J 9/163* (2013.01); *B25J 9/161* (2013.01); *B25J 9/1633* (2013.01); *B25J 9/1661* (2013.01); *B25J 9/1666* (2013.01); *B25J 9/1697* (2013.01)

(58) Field of Classification Search
     CPC ........ B25J 9/161; B25J 9/1633; B25J 9/1661; B25J 9/1666; B25J 9/1697; B25J 9/1664; B25J 9/163; G05B 2219/40504
See application file for complete search history.

(56) References Cited

U.S. PATENT DOCUMENTS

| | | | |
|---|---|---|---|
| 9,840,007 | B1 | 12/2017 | Kuffner |
| 11,130,236 | B2 * | 9/2021 | Chen ...................... B25J 9/1664 |
| 2006/0025890 | A1 * | 2/2006 | Nagatsuka ............. B25J 9/1666 |
| | | | 700/253 |

(Continued)

FOREIGN PATENT DOCUMENTS

| | | |
|---|---|---|
| CN | 102689238 | 9/2012 |
| CN | 104972468 | 10/2015 |

(Continued)

OTHER PUBLICATIONS

Office Action issued in Japanese Patent Application No. P2022-035461, dated Apr. 23, 2024 (with English partial translation).

(Continued)

*Primary Examiner* — Adam R Mott
*Assistant Examiner* — Sagar Kc
(74) *Attorney, Agent, or Firm* — SHIPWAY IP

(57) ABSTRACT

A robot system includes a storage device configured to store a predefined work requirement that indicates a processing target region of a workpiece to be processed by a robot, and circuitry configured to recognize an environment of a working space in which the workpiece is placed, as a work environment. The work environment includes a position and a posture of the workpiece placed in the working space. The circuitry is further configured to identify the processing target region of the workpiece placed in the working space, based on the position and posture of the workpiece placed in the working space. The circuitry is further configured to generate, in real-time, a path of the robot to operate on the identified processing target region based on the work requirement and the identified processing target region; and control the robot based on the generated path.

20 Claims, 6 Drawing Sheets

(56) References Cited

U.S. PATENT DOCUMENTS

| | | | |
|---|---|---|---|
| 2008/0035619 A1* | 2/2008 | Hamaguchi | B25J 9/1664 |
| | | | 219/121.79 |
| 2012/0220194 A1 | 8/2012 | Maloney et al. | |
| 2013/0245822 A1 | 9/2013 | Kawanami et al. | |
| 2014/0235141 A1 | 8/2014 | Maloney et al. | |
| 2015/0290801 A1 | 10/2015 | Kuwahara | |
| 2016/0354925 A1* | 12/2016 | Shimodaira | B25J 9/1633 |
| 2018/0089589 A1* | 3/2018 | Ooba | G05B 19/4182 |
| 2018/0236669 A1 | 8/2018 | Fukuda et al. | |
| 2018/0250814 A1* | 9/2018 | Hashimoto | B23Q 15/12 |
| 2018/0341248 A1* | 11/2018 | Mehr | G06N 20/10 |
| 2019/0009409 A1* | 1/2019 | Kawanami | B25J 9/1697 |
| 2020/0156236 A1* | 5/2020 | Lager | B25J 9/163 |
| 2021/0031368 A1 | 2/2021 | Drumwright | |
| 2021/0086359 A1 | 3/2021 | Eberst et al. | |
| 2021/0154846 A1* | 5/2021 | Watanabe | B25J 9/1666 |
| 2021/0181716 A1 | 6/2021 | Quinlan et al. | |
| 2021/0379762 A1* | 12/2021 | Denenberg | B25J 9/1671 |
| 2022/0016779 A1* | 1/2022 | Wang | B25J 9/163 |
| 2023/0226691 A1* | 7/2023 | Haruo | B25J 9/1633 |
| | | | 700/255 |

FOREIGN PATENT DOCUMENTS

| | | |
|---|---|---|
| CN | 107932505 | 4/2018 |
| CN | 110102855 | 8/2019 |
| CN | 111267073 | 6/2020 |
| CN | 111461911 | 7/2020 |
| CN | 112428274 | 3/2021 |
| CN | 109623656 | 5/2021 |
| CN | 113119110 | 7/2021 |
| JP | H10-063324 | 3/1998 |
| JP | 2004-216528 | 8/2004 |
| JP | 2006-150562 | 6/2006 |
| JP | 2013-184273 | 9/2013 |
| JP | 2015-136772 | 7/2015 |
| JP | S860843 | 4/2021 |

OTHER PUBLICATIONS

Extended Search Report in corresponding European Application No. 23157369.2, dated Jul. 14, 2023.

Office Action issued in Japanese Patent Application No. P2022-035461, dated Jan. 9, 2024 (with English partial translation).

Office Action issued in European Patent Application No. 23157369.2 dated May 21, 2025.

Office Action issued in Japanese Patent Application No. P2024-172988, dated Jan. 6, 2026 (with English partial translation).

Office Action issued in Chinese Patent Application No. 2023101862480 dated Apr. 3, 2026 (with English partial translation).

* cited by examiner

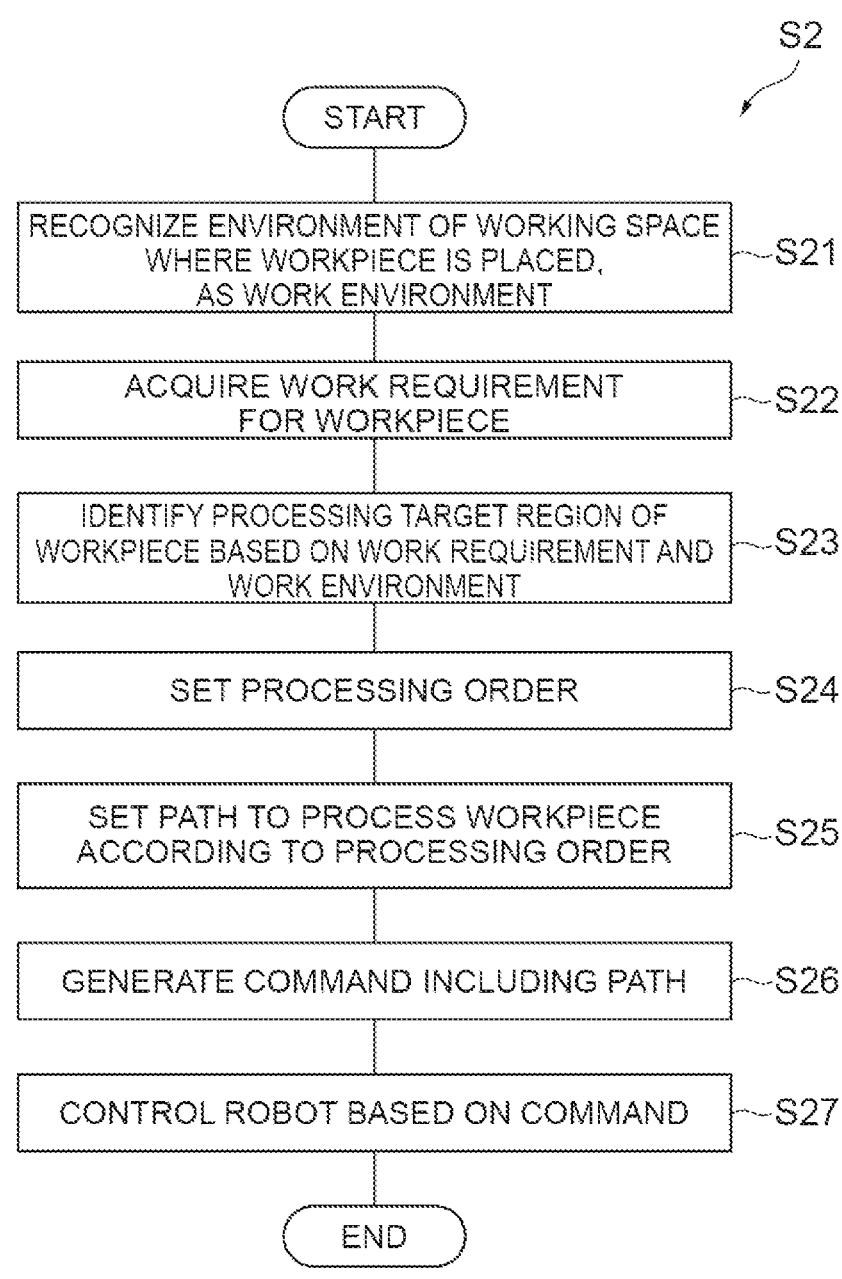

S2

START

RECOGNIZE ENVIRONMENT OF WORKING SPACE
WHERE WORKPIECE IS PLACED,
AS WORK ENVIRONMENT — S21

ACQUIRE WORK REQUIREMENT
FOR WORKPIECE — S22

IDENTIFY PROCESSING TARGET REGION OF
WORKPIECE BASED ON WORK REQUIREMENT AND
WORK ENVIRONMENT — S23

SET PROCESSING ORDER — S24

SET PATH TO PROCESS WORKPIECE
ACCORDING TO PROCESSING ORDER — S25

GENERATE COMMAND INCLUDING PATH — S26

CONTROL ROBOT BASED ON COMMAND — S27

END

ROBOT CONTROL IN WORKING SPACE

CROSS-REFERENCE TO RELATED APPLICATIONS

This application is based upon and claims the benefit of priority from Japanese Patent Application No. 2022-035461, filed on Mar. 8, 2022. The entire contents of which are incorporated herein by reference.

BACKGROUND

Field

One aspect of the present disclosure relates to a robot system, a planning system, a robot control method, and a planning program.

Description of the Related Art

Japanese Patent No. 6860843 describes a robot system including a measurement posture storage unit that stores position information on a robot controller in a plurality of measurement robot postures provided in a robot work environment, a measurement position acquisition unit that acquires a measurement position for each of the plurality of measurement robot postures based on a detection result of a sensor, and a correction unit that corrects an operation position of a robot based on the measurement position.

SUMMARY

A robot system according to an aspect of the present disclosure includes: a storage device configured to store a predefined work requirement that indicates a processing target region of a workpiece to be processed by a robot; and circuitry configured to: recognize an environment of a working space in which the workpiece is placed, as a work environment, wherein the work environment includes a position and a posture of the workpiece placed in the working space; identify the processing target region of the workpiece placed in the working space, based on the position and posture of the workpiece placed in the working space; generate, in real-time, a path of the robot to operate on the identified processing target region based on the work requirement and the identified processing target region; and control the robot based on the generated path.

A robot control method according to an aspect of the present disclosure is executable by a robot system including at least one processor. The method includes: storing a predefined work requirement that indicates a processing target region of a workpiece to be processed by a robot; recognizing an environment of a working space in which the workpiece is placed, as a work environment, wherein the work environment includes a position and a posture of the workpiece placed in the working space; identifying the processing target region of the workpiece placed in the working space, based on the position and posture of the workpiece placed in the working space; generating, in real-time, a path of the robot to operate on the identified processing target region based on the work requirement and the identified processing target region; and controlling the robot based on the generated path.

A non-transitory computer-readable storage medium according to an aspect of the present disclosure stores processor-executable instructions to: retrieve a predefined work requirement that indicates a processing target region of a workpiece to be processed by a robot, from a storage device; recognize an environment of a working space in which the workpiece is placed, as a work environment, wherein the work environment includes a position and a posture of the workpiece placed in the working space; identify the processing target region of the workpiece placed in the working space, based on the position and posture of the workpiece placed in the working space; and generate, in real-time, a path of the robot to operate on the identified processing target region based on the work requirement and the identified processing target region.

BRIEF DESCRIPTION OF THE DRAWINGS

FIG. 1 is a diagram showing an example configuration of a robot system.

FIG. 5 is a flowchart showing an example process for generating a command to a robot.

DETAILED DESCRIPTION

Figure 2:
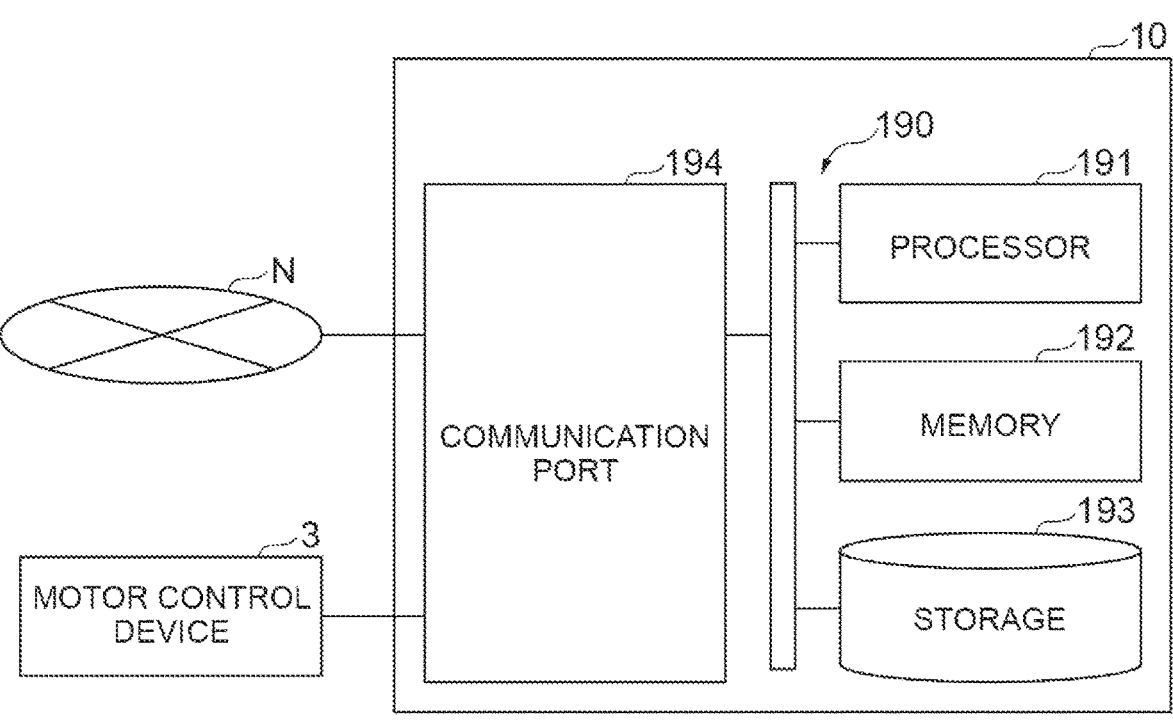
FIG. 2 is a diagram showing an example hardware configuration of a robot controller.

In the following description, with reference to the drawings, the same reference numbers are assigned to the same components or to similar components having the same function, and overlapping description is omitted.

Overview of System

A robot system according to the present disclosure is a control system that automates various operations such as machining and assembly by causing a robot placed in an actual working space to perform a predetermined motion. The robot system generates a path of the robot based on a work requirement predefined with respect for a workpiece and a work environment that is an environment of a working space in which the workpiece is placed. The work requirement refers to information indicating a process to be performed on the workpiece. The work environment may be an actual situation of the working space. The path indicates a trajectory of the robot and constitutes at least part of a command to the robot. Accordingly, the robot system includes a planning system that is a computer system for determining a motion of the robot. The robot system generates an operation program including the path, as a command, and controls the robot based on the command. The robot processes at least one workpiece according to the control.

A series of processes for at least one workpiece is also referred to as a job. Processing for one workpiece is also referred to as a task, which is a minimum unit of processing constituting a job. The work requirement may indicate one or more tasks.

A path of the robot for executing the job can be classified into two types of paths. One is a path that is a trajectory of the robot in the task, and is referred to as a work path in the present disclosure. The other is a path connecting between a start point of a job and a first task, between two consecutive tasks, or between a last task and an end point of the job, and is referred to as an air-cut path in the present disclosure. The air-cut path connecting adjacent tasks connects the end point of a work path in a preceding task and the start point of a work path in a following task. The robot system generates individual work paths and individual air-cut paths based on the work requirement and the work environment, thereby generating the entire path of the robot for executing the job.

In some examples, the robot system sets the path of the robot based on the work requirement and the work environment, without using a teaching point with respect to the robot. With the robot system, once a user teaches a process (i.e., work requirement) to be performed on a workpiece, the robot may autonomously process the workpiece according to an actual situation (i.e., work environment). The teaching point refers to a reference point which is set to define a path, and is set manually. The teaching point is set in a robot coordinate system which is a coordinate system whose origin is set to the robot (for example, a base of the robot). The "teaching point with respect to the robot" refers to a teaching point set in the robot coordinate system in order to operating the robot.

In the related art, setting of a teaching point is also referred to as teaching. In addition, there is teaching playback as a technique of controlling a robot based on the teaching point. In these conventional techniques, a position of the robot in the robot coordinate system is required to be set. It is however difficult for a user to intuitively understand a correspondence relationship between the setting of the position and the task. In addition, in the related art, the teaching is required also to generate an air-cut path that is not directly related to a task. Furthermore, in a case where the work environment such as a relative position relationship between the robot and the workpiece changes, the user needs to recreate the air-cut path. For these reasons, the related art is not suitable for multiproduct production in which tasks or procedures are frequently changed.

As described above, in some examples, the robot system sets the path of the robot based on the work requirement and the work environment, without using the teaching point in the robot coordinate system, i.e., without requiring the teaching and the teaching playback. It may be enough for the user to instruct work on a workpiece, and the teaching is not required. Since the robot system automatically recognizes the work environment by using data obtained from a predetermined sensor or a model indicating the work environment, the robot may be operated flexibly according to the work environment. In addition, the job may be executed without positioning the workpiece or fixing the workpiece with a jig. Since the work requirement with respect to the workpiece is information that may be intuitively created by the user, the user may cause the robot to process the workpiece more intuitively without paying attention to the robot. This may reduce the load on the user. For these reasons, the robot system may promote the introduction of the robot into the multiproduct production.

In some examples, the robot system recognizes the work environment in real-time in response to detecting that the workpiece is placed in the working space. The robot system then generates, as a command, an operation program including a path in real-time, based on the work requirement for the workpiece and the work environment, and controls the robot in real-time based on the command. In this way, the robot system plans the operation of the robot online. Such online control also contributes to improving the autonomy of the robot.

Configuration of System

Figure 1:
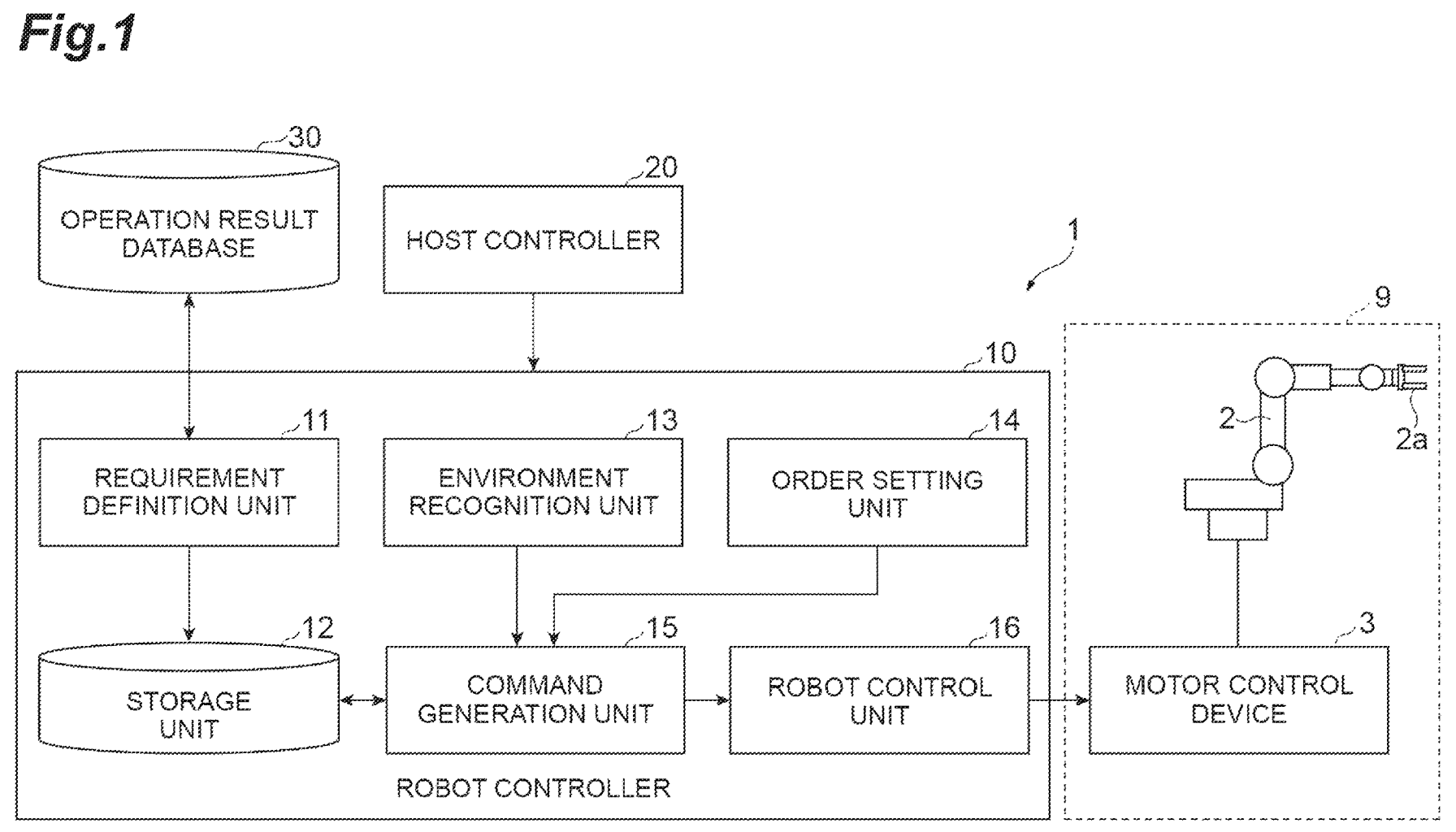

FIG. 1 is a diagram showing a configuration of a robot system 1 according to some examples. The robot system 1 includes a robot 2 placed in a working space 9, a motor control device 3 that controls a motor of the robot 2, and a robot controller 10 that outputs a control signal to the motor control device 3. The robot controller 10 and the motor control device 3 are connected to each other via a communication network. The robot controller 10 connects to a host controller 20 and an operation result database 30 via another communication network. The communication network connecting the devices may be a wired network or a wireless network. The communication network may include at least one of the Internet and an intranet. Alternatively, the communication network may be simply implemented by one communication cable. Although FIG. 1 shows one robot 2 and one robot controller 10, the robot system 1 may include more than one robot 2 or more than one robot controller 10. One robot controller 10 may be connected to a plurality of the robot 2.

The robot 2 is a device that receives power and performs a predetermined operation according to a purpose to perform useful work. In some examples, the robot 2 includes a plurality of joints and is configured to be able to perform various processes with an end effector 2a being held at the tip portion. The joint is an example of a driven object. A joint axis is set for each of the plurality of joints. Some components of the robot 2, such as arms, pivots, etc., rotate about the joint axes such that the robot 2 is able to freely change the position and posture of the tip portion within a predetermined range. In some examples, the robot 2 is a multi-axis serial link type vertical articulated robot. The robot 2 may be a six-axis vertical articulated robot, or a seven-axis vertical articulated robot in which one redundant axis is added to six axes. The robot 2 may be a movable robot, for example a robot supported by an automated guided vehicle (AGV). Alternatively, the robot 2 may be a stationary robot that is fixed in a predetermined place.

The end effector 2a is a device that acts on the workpiece, for example, a device that gives some physical change to the workpiece. The end effector 2a may be various devices such as a polishing tool, a welding gun, a press machine, a sealing nozzle, a screwing device, and the like.

The motor is a device that generates power for driving a driven object of the robot 2 according to electric power supplied from the motor control device 3. The individual driven objects are operated by the individual motors such that the robot 2 performs a predetermined task on the workpiece with the end effector 2a. The motor may be a rotary motor that rotates the driven object or a linear motor that moves the driven object along a straight line. The motor may be a synchronous motor or an induction motor. The motor may be a permanent magnet type synchronous motor such as a surface permanent magnet (SPM) motor or an interior permanent magnet (IPM) motor. The motor may be a synchronous motor without permanent magnets, such as a synchronous reluctance motor. The motor may be a DC motor or an AC motor.

The robot 2 may include at least one sensor that is a device that detects a response of the robot 2 operating by the power from the motor control device 3. The response refers to an output of the robot in response to a command that is an instruction for controlling the robot. For example, the response indicates information related to at least one of motion and a state of the robot 2. The response may indicate information on at least one of a motion and a state of the motor, for example, may indicate at least one of an axis velocity and a magnetic pole position of the motor. In a case where the motor is a rotation type, a rotation angle of the driven object by the motor corresponds to the "position", and a rotation velocity of the driven object by the motor corresponds to the "velocity". The response may indicate information on at least one of a motion and state of the driven object, for example, may indicate at least one of the position, velocity, and force of the driven object. The sensor transmits a response signal indicative of the response to the robot controller 10. The response may be a value obtained by the sensor or may be represented by a value calculated or processed by a predetermined calculation or algorithm. Examples of the sensor may include a rotary encoder that outputs a pulse signal having a frequency proportional to an operational speed of the motor. The rotary encoder may obtain both the position and velocity of the motor.

The motor control device 3 is a device that causes the output of the motor to follow the control signal (i.e., command) from the robot controller 10. Based on the control signal from the robot controller 10, the motor control device 3 generates electric power to move the motor and supplies the electric power to the motor. The supplied electric power corresponds to a driving force command such as a torque command, a current command, or the like. The motor control device 3 may be, for example, an inverter or a servo amplifier. The motor control device 3 may be incorporated into the robot 2. The motor control device 3 may include a sensor that detects a response of the motor control device 3.

The host controller 20 is a device that instructs the robot controller 10 to control the robot 2. The host controller 20 may be a device related to Computer Aided Engineering (CAM). In some examples, the host controller 20 transmits, to the robot controller 10, a request to cause the robot 2 to process a workpiece placed in the working space 9.

The operation result database 30 is a device that stores operation result data indicating that the robot 2 or another robot has processed one or more workpieces in the past. FIG. 1 shows the operation result database 30 as an independent device, the operation result database 30 may however be provided in the robot controller 10, the host controller 20, or another device. The operation result data may indicate one or more processes performed by the robot 2 to be controlled, one or more processes performed by one or more robots other than the robot 2, or both of the processes. Alternatively, the operation result data may indicate one or more processes performed by a peripheral device (e.g., an end effector) of the robot. The past working space may be the working space 9 where the robot 2 is placed or may be a different place from the working space 9.

The robot controller 10 is a device that generates the command for operating the robot 2 and outputs the control signal based on the command. The robot controller 10 is an example of the robot control system. In some examples, the robot controller 10 includes a requirement definition unit 11, a storage unit 12, an environment recognition unit 13, an order setting unit 14, a command generation unit 15, and a robot control unit 16 as functional modules. The requirement definition unit 11 is a functional module that defines the work requirement for the workpiece based on the operation result data. The storage unit 12 is a functional module that stores information to generate the command, for example the defined work requirement. The environment recognition unit 13 is a functional module that recognizes an environment of the working space 9 in which one or more workpieces are placed, as the work environment. The order setting unit 14 is a functional module that sets the processing order of the one or more workpieces. The command generation unit 15 is a functional module that generates a path of the robot 2 for causing the robot 2 located in the working space 9 to process the one or more workpieces in the processing order, based on the work requirement and the work environment, and generates a command including the path. The robot control unit 16 is a functional module that controls the robot 2 based on the command.

FIG. 2 is a diagram showing an example hardware configuration of the robot controller 10. The robot controller 10 includes circuitry 190. In some examples, the circuitry 190 comprises at least one processor 191, a memory 192, a storage 193, and at least one communication port 194. The storage 193 is a non-volatile storage medium and stores a program for realizing each functional module described above. The storage 193 may be configured by at least one hard disk or nonvolatile memory, for example. The memory 192 temporarily stores a program loaded from the storage 193, a calculation result by the processor 191, and the like. The memory 192 may comprise, for example, at least one random access memory. The processor 191 configures each functional module by executing the program in cooperation with the memory 192. The communication port 194 performs data transmission with other devices in accordance with commands from the processor 191. For example, the robot controller 10 has one communication port 194 that is connected to a communication network N and transmits and receives signals to and from the host controller 20 and the operation result database 30, and another communication port 194 that transmits and receives signals to and from the motor control device 3.

Each functional module of the robot controller 10 is implemented by causing the processor 191 or the memory 192 to read a robot control program and causing the processor 191 to execute the program. The robot control program includes code for implementing each functional module of the robot controller 10. The processor 191 operates the communication port 194 in accordance with the robot control program and reads and writes data in the memory 192 or the storage 193.

The robot control program may be provided after being fixedly recorded in a non-transitory recording medium such as a CD-ROM, a DVD-ROM, or a semiconductor memory. Alternatively, the robot control program may be provided via a communication network as a data signal superimposed on a carrier wave.

In some examples, the robot control program includes a planning program that generates the path for the robot 2 based on the work requirement and the work environment. The planning program may be provided independently.

Robot Control Method

Figure 3:
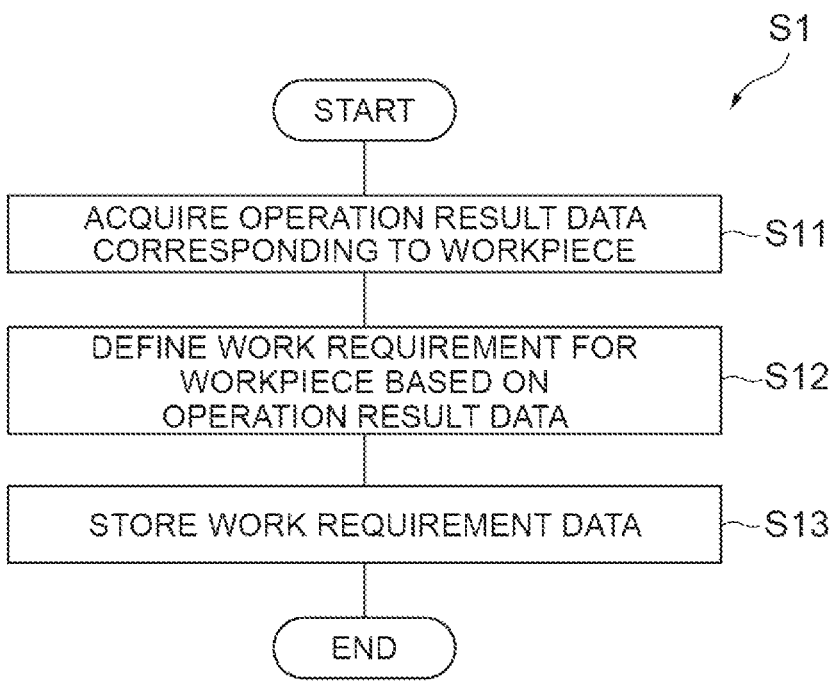
FIG. 3 is a flowchart showing an example process for defining a work requirement for a workpiece.
Figure 4:
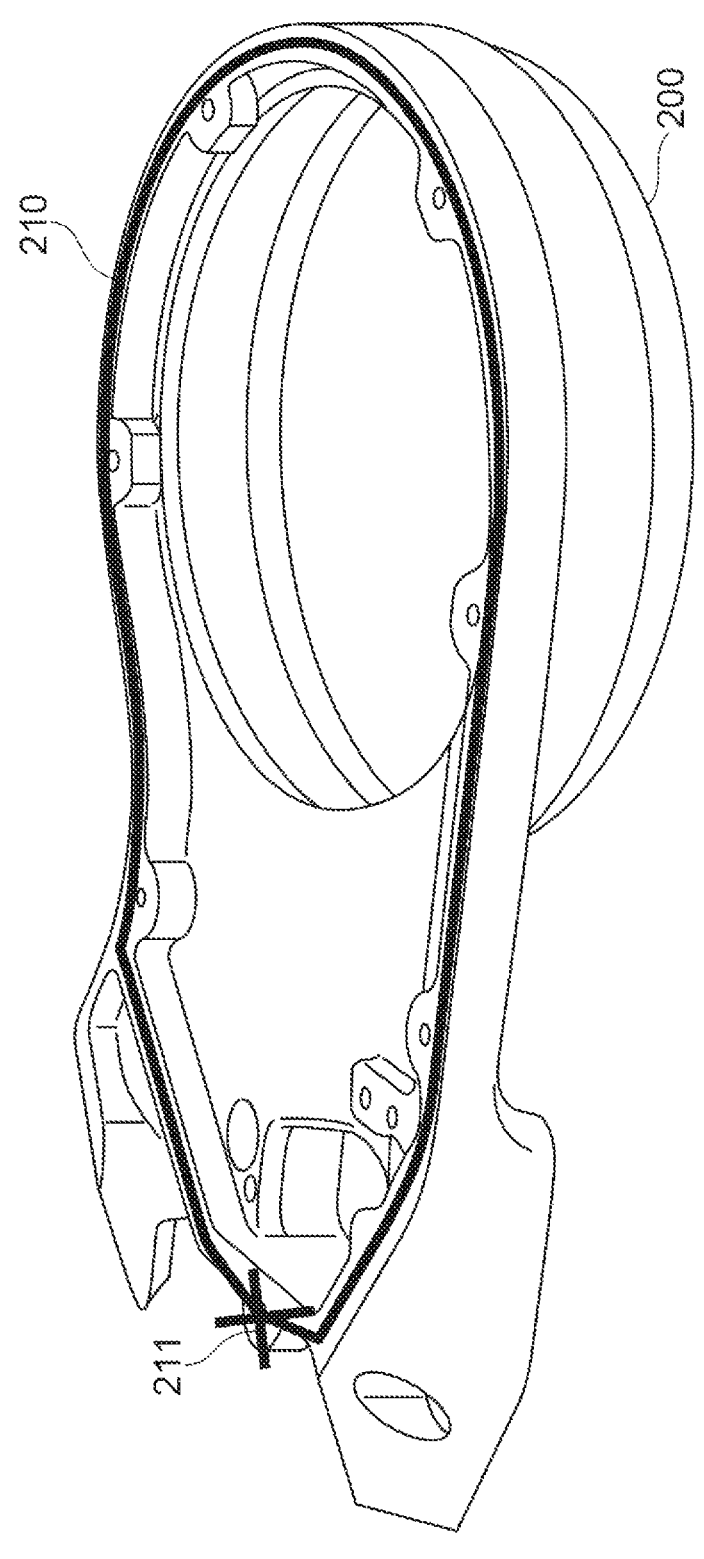
FIG. 4 is a diagram showing an example work requirement for a workpiece.
Figure 6:
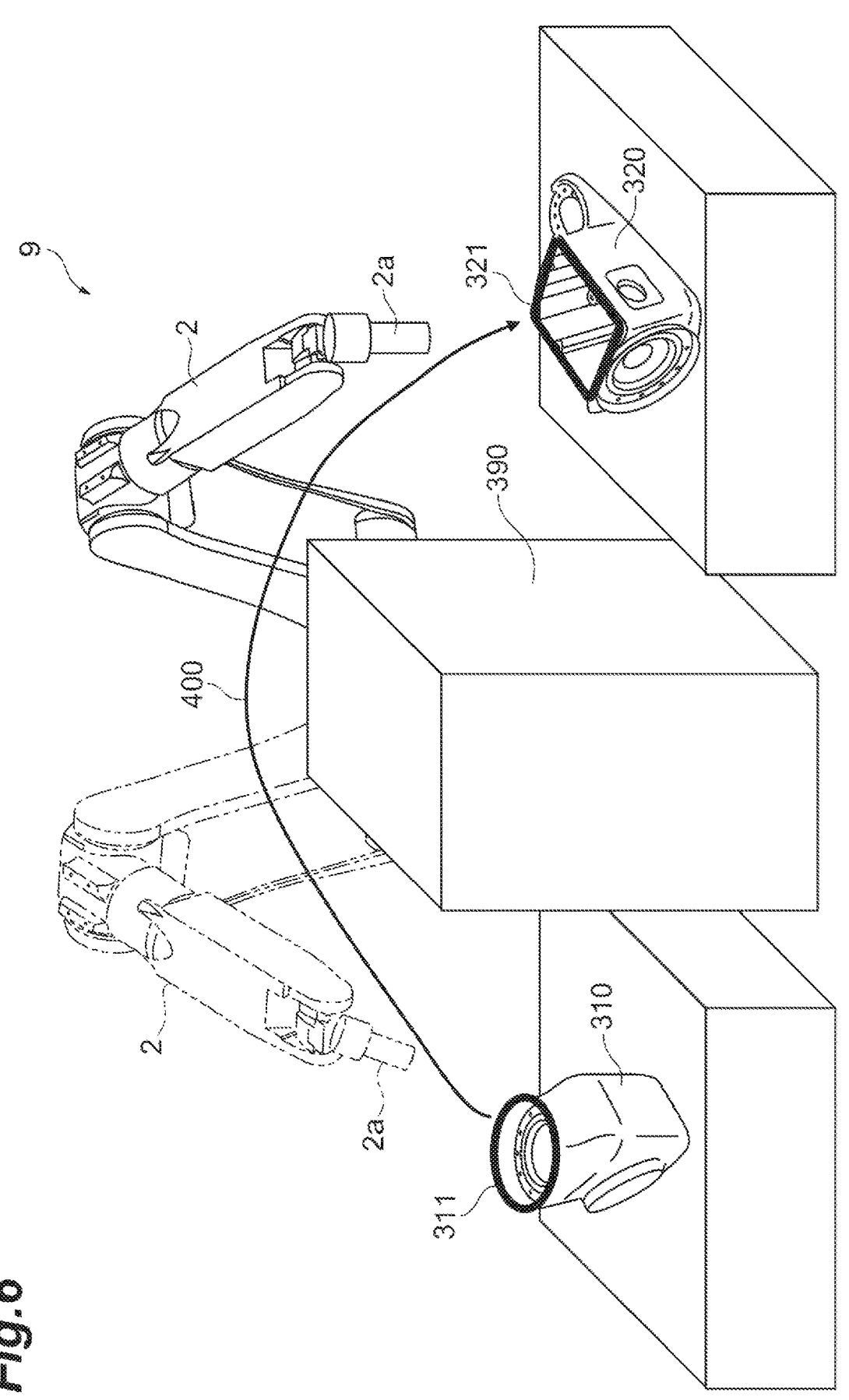
FIG. 6 is a diagram showing an example path of a robot in a working space.

As some examples of the robot control method according to the present disclosure, some examples of processing procedure executed by the robot controller 10 will be described with reference to FIGS. 3 to 6. FIG. 3 is a flowchart showing an example process for defining the work requirement for the workpiece, as a process flow S1. FIG. 4 is a diagram showing an example work requirement for the workpiece. FIG. 5 is a flowchart showing an example process for generating the command to the robot, as a process flow S2. FIG. 6 is a diagram showing an example path of the robot in the working space. The robot controller 10 executes the process flow S1 with respect to the definition of work requirement, and executes the process flow S2 with respect to the generation of commands.

(Definition of Work Requirement)

In some examples, the work requirement is defined by a user of the robot system 1, and is stored in advance in the storage unit 12 by a predetermined operation by the user. As other examples, the work requirement may be defined by the requirement definition unit 11. For example, the requirement definition unit 11 may update the work requirement defined by the user and stored in the storage unit 12. Some examples of the definition of work requirement by the requirement definition unit 11 will be described with reference to FIG. 3. The process flow S1 is executed after the robot 2 or another robot processes one or more workpieces in the past working space and the operation result data indicating the processing is stored in the operation result database 30. The operation result data may indicate a past process that included a teaching path for operating on one or more workpieces. In some examples, the process flow S1 is executed for each of a plurality of types of workpiece.

In step S11, the requirement definition unit 11 acquires the operation result data corresponding to the workpiece. In some examples, the requirement definition unit 11 accesses the operation result database 30 to retrieve the operation result data corresponding to a certain type of a workpiece WP. In a case where n workpieces WP have been processed in the past, the operation result data includes records indicating n times of processing for the workpiece WP. In this case, the requirement definition unit 11 retrieves at least part of the records from the operation result database 30.

In some examples, the operation result data includes a plurality of teaching points with respect to the robot 2 or another robot, the plurality of teaching points representing a process on a workpiece by the robot, and a position of the workpiece in a past working space where the process was performed. The "position of workpiece" is represented by a coordinate value in the robot coordinate system. For example, the position may be obtained by converting a coordinate value in a sensor coordinate system into a coordinate value in the robot coordinate system. The sensor coordinate system is a coordinate system whose origin is set to the sensor, and may be, for example, a camera coordinate system whose origin is set to a lens of a camera. The teaching point and the position of the workpiece indicated by the operation result data may be values obtained by actual processing in an actual working space or values obtained by past simulation. The simulation refers to a process of expressing the behavior of a certain system in a simulated manner on a computer.

In step S12, the requirement definition unit 11 defines the work requirement for the workpiece based on the operation result data. In a case where a plurality of records of the operation result data are used, the requirement definition unit 11 may define the work requirement by a calculation including statistical processing such as regression.

In some examples, the requirement definition unit 11 identifies a region on the workpiece to which the processing by the robot is applied, as a processing target region, based on the teaching point indicated by the operation result data and the position of the workpiece. For example, the processing target region is a region affected by the end effector. The processing target region is a region to be processed in the workpiece, and is an example of the work requirement. Thus, the requirement definition unit 11 defines the processing target region as at least part of the work requirement. Each processing target region may be point-like, linear, or two-dimensional shape. The requirement definition unit 11 identifies one or more processing target regions for one workpiece. In some examples, the requirement definition unit 11 converts coordinate values indicating the position and shape of each processing target region from the robot coordinate system to a workpiece coordinate system, and identifies the processing target region by coordinate values in the workpiece coordinate system. The workpiece coordinate system refers to a coordinate system whose origin is set to workpiece.

In some examples, the requirement definition unit 11 may identify the processing target region further using a workpiece model, which is a model that virtually represents the workpiece. The workpiece model is a three-dimensional model indicating a structure of the workpiece and is generated by, for example, computer-aided design (CAD). Since the workpiece model is expressed using the workpiece coordinate system, the requirement definition unit 11 may associate the processing target region with the region model. With such association, the processing target region includes or indicates a relative position with respect to the region model. In some examples, the "relative position with respect to the workpiece model" is a position set on the workpiece model in the workpiece coordinate system.

The requirement definition unit 11 may identify an approach point at which the robot approaches the workpiece, as at least part of the processing target region, and define the work requirement including the approach point. The approach point refers to a location where a robot attempting to process a workpiece first contacts the workpiece.

The requirement definition unit 11 may define an operational speed of the robot as at least part of the work requirement, based on the teaching point indicated by the operation result data and the position of the workpiece. For example, the requirement definition unit 11 may estimate the operational speed of the robot in a past process based on the history of a correspondence relationship between the position of the workpiece and time, and define the operational speed as at least part of the work requirement. That is, the predefined work requirement is based, at least in part, on the operational speed of the robot in performing the past process.

The requirement definition unit 11 may define a force applied to the workpiece by the robot, as at least part of the work requirement, based on the teaching point indicated by the operation result data and the position of the workpiece. Examples of the force include a pressing force generated when the robot presses the workpiece. In some examples, the requirement definition unit 11 estimates a force applied to the workpiece by the robot in a past process based on a history of correspondence relationship between the position of the workpiece and time, and specification data indicating specifications of the robot or end effector, and defines the force as at least part of the work requirement. That is, the predefined work requirement is based, at least in part, on the force applied by the robot to the one or more workpieces in performing the past process.

In step S13, the requirement definition unit 11 generates work requirement data indicating the defined work requirement and stores the work requirement data in the storage unit 12. As a result, the work requirement are updated or newly registered. In some examples, the requirement definition unit 11 generates and stores the work requirement data in which the work requirement and the workpiece model are associated with each other. That is, the work requirement, the workpiece model, and the processing target region are predefined information. Both the workpiece model and the processing target region indicated by the work requirement data are defined in the workpiece coordinate system. Therefore, the work requirement, the workpiece model, and the processing target region are different techniques from the teaching point set in the robot coordinate system. In addition, the process flow S1 is different from the teaching, which is conventional art.

An example of the defined work requirement will be described with reference to FIG. 4. This example shows a processing target region 210 defined on a workpiece model 200. For example, the processing target region 210 indicates a region to be sealed. The processing target region 210 includes an approach point 211 indicated by an X mark in FIG. 4.

The work requirement defined by the requirement definition unit 11 are obtained from an operation of the robot that processed the workpiece based on the teaching point manually set in the past. The work requirement may therefore be information reflecting experience and know-how about robot control for the workpiece. In some examples, since the processing target region 210 including the approach point 211 is automatically defined, the user of the robot system 1 is able to prepare the work requirement indicated by the workpiece model 200 and the processing target region 210, once the user prepares the workpiece model 200. It should be noted that, as described above, the work requirement shown in FIG. 4 may be defined by the user.

As described above, the process flow S1 may be performed for each of the plurality of types of workpiece. In this case, the storage unit 12 may store the work requirement data for various workpieces that may be processed by the robot 2. That is, the storage unit 12 may store the work requirement for each of the plurality of workpieces.

Generation of Command

An example process for generating a command for operating the robot 2 will be described with reference to FIG. 5. In some examples, the robot system 1 executes the process flow S2 in response to receiving a predetermined request from the host controller 20.

The process flow S2 is executed on the assumption that information for generating a command is stored in the storage unit 12. As described above, the storage unit 12 stores the work requirement data. The storage unit 12 may further store at least one of an obstacle model and tool information. The obstacle model refers to a model of an obstacle, and is represented by, for example, a three-dimensional model indicating the structure of an obstacle. The tool information refers to information related to the end effector 2a of the robot 2 and indicates, for example, the structure and specifications of the end effector 2a.

In step S21, the environment recognition unit 13 recognizes or detects an environment of the working space 9 where at least one workpiece is placed, as the work environment. In some examples, the environment recognition unit 13 recognizes a current work environment in real-time. In some examples, the environment recognition unit 13 may recognize the work environment based on sensor data obtained from a sensor monitoring the working space 9. For example, the sensor is an imaging device such as a camera, and the sensor data is image data obtained from the imaging device. The image data may be a still image, a video, or a frame of video.

In some examples, the environment recognition unit 13 recognizes or detects a position of each of one or more workpieces as at least part of the work environment. The environment recognition unit 13 may further recognize a posture of each of the one or more workpieces as at least part of the work environment. The position of the workpiece refers to a location where the workpiece is placed. The posture of the workpiece refers to at least one of an orientation and an inclination of the placed workpiece. In some examples, the environment recognition unit 13 may recognize the position and posture of the workpiece based on the workpiece model. For example, the environment recognition unit 13 may analyze the image data using one or more workpiece models stored in the storage unit 12, identify an object that matches a certain workpiece model as a workpiece, and recognize the position and posture of the identified workpiece.

In some examples, the environment recognition unit 13 recognizes or detects the position and posture of the robot 2 as at least one of the work environment. For example, the environment recognition unit 13 recognizes the position and posture of the robot 2 based on a response obtained from the robot 2 or the motor control device 3.

In some examples, the environment recognition unit 13 recognizes or detects an obstacle for the robot 2 that is to process the workpiece, as at least part of the work environment. It should be noted that in the case where the robot 2 is to process a workpiece, the workpiece is not an obstacle. The environment recognition unit 13 recognizes the position and shape of the obstacle. In a case where the obstacle has a movable portion, the environment recognition unit 13 may recognize a particular posture of the obstacle as the shape of the obstacle. In some examples, the environment recognition unit 13 may recognize the position and shape of the obstacle based on an obstacle model, which is a three-dimensional model indicating a structure of the obstacle. For example, the environment recognition unit 13 may analyze the image data using one or more obstacle models stored in the storage unit 12, identify an object that matches a certain obstacle model as an obstacle, and recognize the position and shape of the identified obstacle.

In step S22, the command generation unit 15 acquires the work requirement for the workpiece. In some examples, for each of the recognized one or more workpieces, the command generation unit 15 retrieves the work requirement data corresponding to the workpiece from the storage unit 12 to obtain the work requirement. Alternatively, the command generation unit 15 may retrieve from the storage unit 12 the work requirement corresponding to the workpiece designated by the host controller 20 or a user instruction. The command generation unit 15 may adjust at least part of the acquired the work requirement (e.g., operating speed, force, approach point, etc.) of the workpiece based on the recognized work environment. The command generation unit 15 may perform the adjustment according to the host controller 20 or a user instruction, or may perform the adjustment automatically according to predetermined rules.

In step S23, the command generation unit 15 identifies the processing target region of the workpiece placed in the working space 9, based on the work requirement and the work environment. That is, the command generation unit 15 identifies a location on the workpiece that is actually to be processed in the working space 9. The command generation unit 15 identifies the processing target region for each of the at least one workpieces. The command generation unit 15 may identify the processing target region in the working space 9, based on the position and posture of the workpiece placed in the working space 9 and the relative position indicated by the work requirement data. For example, the command generation unit 15 converts a coordinate value of the processing target region in the workpiece coordinate system into a coordinate value on the sensor coordinate system such as the camera coordinate system. The command generation unit 15 further converts the coordinate value on the sensor coordinate system into a coordinate value on the robot coordinate system by using a relative relationship between the robot 2 and the sensor coordinate system identified by calibration in advance. The command generation unit 15 identifies the processing target region in the working space 9 by the series of processes. In a case where the processing target region includes an approach point, the command generation unit 15 further identifies the approach point of the workpiece placed in the working space 9, based on the work requirement and the work environment.

In step S24, the order setting unit 14 sets a processing order of at least one workpiece. In a case where the number of workpieces in the working space 9 is one, the order setting unit 14 sets the processing order of that workpiece to one (1). In some examples, the order setting unit 14 may set the processing order according to a command from the host controller 20 or a user instruction. Alternatively, the order setting unit 14 may dynamically set the processing order based on a spatial arrangement of the plurality of workpieces in the recognized work environment. The "dynamically setting the processing order" refers to setting the processing order according to an actual situation of the working space 9. The order setting unit 14 may dynamically and automatically set the processing order without being externally designated. Alternatively, the order setting unit 14 may dynamically set the processing order according to a command from the host controller 20 or a user instruction, which is received in real-time. The order setting unit 14 may calculate an evaluated value related to the operation of the robot 2 for processing one or more workpieces by a technique such as simulation, based on positions and postures of the one or more workpieces, and set the processing order based on the evaluated value. In some examples, the order setting unit 14 calculates the evaluated value based on the physical quantity related to the motion of the robot 2 and sets the processing order based on the evaluated value. Examples of the physical quantity include a movement distance of the robot 2 required to process all workpieces in the working space 9, time required to complete the process (i.e., cycle time), and energy consumption (e.g., power consumption) required for the process. For example, the order setting unit 14 may calculate an evaluated value based on at least one physical quantity, for each of the processing orders, and finally set a processing order corresponding to an evaluated value that is expected to be optimal.

In step S25, the command generation unit 15 sets a path to cause the robot 2 to process at least one workpiece according to the processing order. The command generation unit 15 generates the path based on the position of the workpiece placed in the working space 9. The command generation unit 15 may generate the path further based on the posture of the workpiece. In some examples, the command generation unit 15 generates the path based on the position of at least one processing target region in the working space 9 (i.e., the position of the processing target region identified in step S23). The work requirement may include various other conditions in addition to or instead of the processing target region. Examples of general condition that does not depend on work include an operational speed of the robot 2, an adjustment ratio of the acceleration/deceleration speed of the robot 2, and a degree of approach of the robot 2 to the approach point. Examples of condition that depends on specific work include a force applied to the workpiece by the robot 2, a condition of a signal output of a peripheral device (e.g., end effector) of the robot 2, and characteristic conditions of the peripheral device. For example, the command generation unit 15 generates the path based on at least one of the operational speed and force. In a case where an obstacle is recognized, the command generation unit 15 may generate the path based on a position of the obstacle, such that the obstacle does not interfere with the robot 2 (i.e., so that the robot 2 avoids the obstacle). The interference refers to a phenomenon in which a certain object contacts or collides with another object. It should be noted that in a case where the robot 2 is to process a workpiece, contact between the robot 2 and the workpiece is not an interference.

In some examples, the command generation unit 15 converts coordinate values of the workpiece, the processing target region, and the obstacle defined by the sensor coordinate system such as the camera coordinate system, into the robot coordinate system, in generating the path. The command generation unit 15 then sets the path of the robot in the robot coordinate system, based on the converted coordinate values.

The path of the robot 2 may be a path of the end effector 2a. In some examples, the command generation unit 15 retrieves the tool information from the storage unit 12 and generates the path of the end effector 2a further based on the tool information.

As described above, the path of the robot 2 includes at least one work path and at least one air-cut path. In some examples, the command generation unit 15 generates individual work paths based on individual processing target regions. For example, the command generation unit 15 generates a work path along the processing target region. The command generation unit 15 further generates individual air-cut paths. In a case where an approach point is identified for a certain workpiece, the command generation unit 15 generates an air-cut path for moving the robot 2 to the workpiece, based on the position of the approach point.

In some examples, the command generation unit 15 generates each air-cut path in the following manner. That is, the command generation unit 15 identifies a start point and an end point of the air-cut path to be generated, and generates a temporary path connecting the two points by a straight line. The command generation unit 15 then verifies an operation of the robot 2 based on the temporary path by simulation. In a case of detecting interference between the robot 2 and an obstacle in the simulation, the command generation unit 15 sets one or more via-points between the start point and the end point at random or by an optimizing method, and generates a new temporary path from the start point to the end point through the one or more via-points. The command generation unit 15 then verifies an operation of the robot 2 based on the new temporary path by simulation. In some examples, the command generation unit 15 repeats the process including the generation of temporary path and the interference check until no interference is detected, and sets a finally obtained temporary path as the air-cut path. The command generation unit 15 may execute optimization, such as distance reduction. on the temporary path in which no interference is detected, and set the air-cut path.

In a case where a plurality of workpieces are placed in the working space 9, the plurality of workpieces include a first workpiece and a second workpiece to be processed next to the first workpiece. In this case, the command generation unit 15 generates an air-cut path for moving the robot 2 that has processed the first workpiece to the second workpiece. In a case where the plurality of workpieces includes three or more workpieces, the command generation unit 15 generates each air-cut path while changing the combination of first workpiece and second workpiece, that is, while changing the combination of two consecutive tasks.

It should be noted that the path generated by the command generation unit 15 is a new path that differs from the teaching path included in the past process. In some examples, the generated path may include a modification to the operational speed in real-time, based on the position and posture of the workpiece in the working space. In some examples, the generated path may include a modification to the applied force in real-time, based on the position and posture of the workpiece in the working space.

In step S26, the command generation unit 15 generates a command including the path. In some examples, the command generation unit 15 generates an operation program indicating the generated path, as the command. The operation program includes a series of code or commands for operating the robot 2 along the path.

In step S27, the robot control unit 16 controls the robot 2 based on the command. In some examples, the robot control unit 16 generates a series of control signals according to the operation program and sequentially outputs the control signals to the motor control device 3. The motor control device 3 sequentially generates electric power for moving the motor based on the control signals, and sequentially supplies the electric power to the motor. As a result, the robot 2 executes a job and processes at least one workpiece existing in the working space 9.

An example path of the robot in the working space will be described with reference to FIG. 6. In this example, the robot controller 10 causes the robot 2 to perform sealing on two workpieces 310 and 320 placed in the working space 9. The end effector 2a is a sealing nozzle. For the workpieces 310 and 320, processing target regions 311 and 321, to which the sealing are applied, is predefined as at least part of the work requirement, respectively. In the working space 9, an obstacle 390 exists in a manner of being sandwiched between the workpieces 310 and 320.

The robot controller 10 recognizes such an environment of the working space 9 as a work environment (step S21), and acquires a work requirement for each of the workpieces 310 and 320 (step S22). The robot controller 10 identifies actual processing target regions 311 and 321 based on the work requirements and the work environment (step S23). Also, the robot controller 10 sets a processing order of the workpieces 310 and 320 (step S24). For example, the robot controller 10 dynamically sets the processing order of the workpiece 310 to one (1) and the processing order of the workpiece 320 to two (2). The robot controller 10 sets a path for causing the robot 2 to process the workpieces 310 and 320 according to that order (step S25). In this example, the path represents a trajectory of the end effector 2a, and FIG. 6 represents an air-cut path 400 that is part of the path. The air-cut path 400 extends from an end of the work path corresponding to the processing target region 311 to a start of the work path corresponding to the processing target region 321, avoiding the obstacle 390. The robot controller 10 generates a command including the path for processing the workpieces 310 and 320 (step S26), and controls the robot 2 based on the command (step S27).

Regarding the example of the series of processes described with reference to FIG. 6, part of steps S21-S27 may be performed manually. For example, as described above, the setting of the processing order (step S24) may be performed based on a user instruction.

As described above, in the process flow S2, the command generation unit 15 generates the path based on the work requirement and the work environment, without using the teaching point with respect to the robot 2, and generates the operation program including the path as the command. The path may be generated in real-time by comparing the position of the workpiece in the working space to a past working space in which the past process has been performed. The path is generated in real-time without including the plurality of teaching points from the past process.

The process flow S2 may be executed repeatedly. For example, the robot controller 10 may automatically execute the process flow S2 in response to a new workpiece being placed in the working space 9. Alternatively, the robot controller 10 may execute the process flow S2 in response to a new request from the host controller 20 based on the placement of the new workpiece. In some examples, the environment recognition unit 13 may detect a new workpiece in the working space, and the order setting unit 14 may set the processing order in real-time in response to detecting the new workpiece. The robot may process the plurality of workpieces including the new workpiece in the processing order.

As described above, a robot system according to an aspect of the present disclosure includes: a storage device configured to store a predefined work requirement that indicates a processing target region of a workpiece to be processed by a robot; and circuitry configured to: recognize an environment of a working space in which the workpiece is placed, as a work environment, wherein the work environment includes a position and a posture of the workpiece placed in the working space; identify the processing target region of the workpiece placed in the working space, based on the position and posture of the workpiece placed in the working space; generate, in real-time, a path of the robot to operate on the identified processing target region based on the work requirement and the identified processing target region; and control the robot based on the generated path.

A robot control method according to an aspect of the present disclosure is executable by a robot system including at least one processor. The method includes: storing a predefined work requirement that indicates a processing target region of a workpiece to be processed by a robot; recognizing an environment of a working space in which the workpiece is placed, as a work environment, wherein the work environment includes a position and a posture of the workpiece placed in the working space; identifying the processing target region of the workpiece placed in the working space, based on the position and posture of the workpiece placed in the working space; generating, in real-time, a path of the robot to operate on the identified processing target region based on the work requirement and the identified processing target region; and controlling the robot based on the generated path.

A non-transitory computer-readable storage medium according to an aspect of the present disclosure stores processor-executable instructions to: retrieve a predefined work requirement that indicates a processing target region of a workpiece to be processed by a robot, from a storage device; recognize an environment of a working space in which the workpiece is placed, as a work environment, wherein the work environment includes a position and a posture of the workpiece placed in the working space; identify the processing target region of the workpiece placed in the working space, based on the position and posture of the workpiece placed in the working space; and generate, in real-time, a path of the robot to operate on the identified processing target region based on the work requirement and the identified processing target region.

In some aspects, once the work requirement predefined with respect to the workpiece is provided, the path of the robot is generated based on the work environment where the workpiece exists and the work requirement, and the robot is controlled based on the path. Since the robot control including the path planning is performed once a task to be executed by the robot is prepared, the autonomy of the robot may be enhanced. Further, since the work requirement is defined for the workpiece, a user may prepare the work requirement intuitively.

In other aspects, once the work requirement defined with respect to the workpiece is provided, the path of the robot is generated based on the work environment where the workpiece exists and the work requirement. Thus, once a task to be executed by the robot is prepared, the path may be generated easily. Further, since the work requirement is defined for the workpiece, a user may prepare the work requirement intuitively.

In other aspects, since the path is generated based on an actual position of the workpiece, positioning of the workpiece may be avoided. For example, the position and posture of the workpiece may not need to be fixed. Thus, the autonomy of the robot that processes the workpiece may be further enhanced.

In other aspects, since the path is generated based on the position of the processing target region to be actually processed by the robot in the working space, the workpiece may be more accurately processed.

In some examples, the predefined work requirement may be based on teaching points obtained from a past process that included a teaching path for operating on one or more workpieces, and the circuitry may be configured to generate the path as a new path that differs from the teaching path, based on the position and posture of the workpiece in the working space, without including the teaching points in the new path. Since setting of the teaching point is omitted, the path may be easily generated.

In some examples, the predefined work requirement may be based, at least in part, on an operational speed of the robot in performing the past process, and the path may include a modification to the operational speed in real-time, based on the position and posture of the workpiece in the working space.

In some examples, the predefined work requirement may be based, at least in part, on a force applied by the robot to the one or more workpieces in performing the past process, and the path may include a modification to the applied force in real-time, based on the position and posture of the workpiece in the working space.

In some examples, the robot system may further include one or more sensors configured to monitor the position and posture of the workpiece in order to identify the processing target region of the workpiece in real-time. Since the work environment is more accurately recognized by this configuration, the robot may be more accurately controlled according to an actual situation.

In some examples, the processing target region may include a relative position with respect to a workpiece model that is a model indicating the workpiece, and the circuitry may be configured to: recognize a position and a posture of the workpiece placed in the working space, based on the workpiece model; and identify the processing target region in the working space, based on the position and posture of the workpiece, and the relative position. Once the processing target region is defined with respect to the workpiece model, as the relative position, the path is generated based on the actual position of the processing target region in the working space, and the robot is controlled based on the path. Therefore, the autonomy of the robot may be further enhanced.

In some examples, the processing target region may include an approach point at which the robot approaches the workpiece, and the circuitry may be configured to: identify the approach point of the workpiece placed in the working space, based on the work requirement and the work environment; and generate, as at least part of the path, an air-cut path for moving the robot to the workpiece, based on a position of the identified approach point. Since the path is generated based on the position at which the robot is to approach actually in the working space, the workpiece may be processed more accurately.

In some examples, the storage device may be configured to store work requirements for a plurality of workpieces, and the circuitry may be configured to: detect the plurality of workpieces including the workpiece placed in the working space; set a processing order of the robot to process the plurality of the workpieces; recognize a spatial arrangement of the plurality of workpieces placed in the working space; and generate the path for causing the robot to process the plurality of workpieces in accordance with the processing order based, at least in part, on the spatial arrangement. Since the processing order of the plurality of workpieces is considered, the path of the robot for sequentially processing the plurality of workpieces placed in the working space may be easily generated.

In some examples, the circuitry may be configured to: acquire a physical quantity related to a motion of the robot; calculate an evaluated value based on the physical quantity; and set the processing order in real-time based on the evaluated value.

In some examples, the circuitry may be configured to: detect a new workpiece in the working space; and set the processing order in real-time in response to detecting the new workpiece, wherein the robot processes the plurality of workpieces including the new workpiece in the processing order.

In some examples, the circuitry may be configured to dynamically and automatically set the processing order based on an arrangement of the plurality of workpieces in the recognized work environment. Since the processing order of the plurality of workpieces is automatically set according to the actual situation in the working space, the path of the robot may be generated even if the processing order is not provided in advance.

In some examples, the plurality of workpieces may include a first workpiece and a second workpiece, and the circuitry may be configured to generate, as at least part of the path, an air-cut path for moving the robot that has finished processing the first workpiece to the second workpiece. In this case, the air-cut path between workpieces (tasks) may be easily generated without using a teaching point.

In some examples, the storage device may be configured to store an operational speed of the robot, as the work requirement, and the circuitry may be configured to generate the path based on the operational speed. The operational speed of the robot affects the generation of the path. Thus, a more accurate path may be generated by taking the operational speed into consideration.

In some examples, the storage device may be configured to store a force applied to the workpiece by the robot, as the work requirement, and the circuitry may be configured to generate the path based on the applied force. In order to apply a force such as a pressing force to a workpiece, it is important to set a path for realizing the application. Thus, a more accurate path may be generated by taking the force into consideration.

In some examples, the circuitry may be configured to: recognize the work environment including an obstacle for the robot that is to process the workpiece; and generate the path based on a position of the obstacle, such that the obstacle does not interfere with the robot. With this configuration, the path for operating while avoiding an obstacle may be easily generated.

In some examples, the storage device may be configured to store an obstacle model, and the circuitry may be configured to: detect an obstacle placed in the working space based on the obstacle model; and generate the path such that the obstacle does not interfere with the robot. By using the obstacle model, the obstacle in the working space may be recognized more accurately.

In some examples, the storage device may be configured to store tool information on an end effector of the robot, and the circuitry may be configured to generate a path of the end effector based on the stored tool information. By using the information on the end effector, the path of the end effector directly acting on the workpiece may be easily generated.

In some examples, the circuitry may be configured to recognize the work environment based on sensor data obtained from a sensor that monitors the working space. Since the work environment is more accurately recognized by this configuration, the robot may be more accurately controlled according to an actual situation.

In some examples, the circuitry may be configured to define the work requirement based on a plurality of teaching points obtained from a past process performed on one or more workpieces, and the path may be generated in real-time by comparing the position of the workpiece in the working space to a past working space in which the past process has been performed. Since the work requirement are automatically defined from the past data, the load for generating the work requirement may be eliminated or reduced. In addition, experience and know-how about processing a workpiece may be automatically inherited to future operations.

In some examples, the path may be generated in real-time without including the plurality of teaching points from the past process.

In some examples, the circuitry may be configured to: recognize the work environment in real-time in response to detecting that the workpiece is placed in the working space; generate the path in real-time in response to recognizing the work environment in real-time; and control the robot in real-time based on the path generated in real-time.

Additional Examples

It is to be understood that not all aspects, advantages and features described herein may necessarily be achieved by, or included in, any one particular example. Indeed, having described and illustrated various examples herein, it should be apparent that other examples may be modified in arrangement and detail.

Another functional configuration may be applied to the robot system and the planning system. For example, at least one of the definition unit and the setting unit may be omitted. At least some of the definition unit, storage unit, recognition unit, setting unit, and generation unit, which are the functional modules related to the planning system, may be implemented in another device, such as the host controller 20. At least some of the functional modules related to the robot system may be implemented in the motor control device.

The hardware configuration of the system is not limited to examples in which each functional module is implemented by executing a program. For example, at least part of the functional modules described above may be configured by a logic circuit specialized for the function, or by an application specific integrated circuit (ASIC) in which the logic circuit is integrated.

The procedure of the method executed by at least one processor may be different from the above examples. For example, some of the steps or processes described above may be omitted, or the steps may be executed in a different order. Further, any two or more steps among the above-described steps may be combined, or part of steps may be modified or deleted. Alternatively, another step may be executed in addition to the above-described steps.

In a case where the magnitude relationship between two numerical values is compared in the computer system or the computer, either of two criteria of "equal to or greater than" and "greater than" may be used, and either of two criteria of "equal to or less than" and "less than" may be used.

We claim all modifications and variations coming within the spirit and scope of the subject matter claimed herein.

Regarding the above examples, the following appendices are provided by way of further illustration.

(Appendix 1) A robot system comprising:
a storage unit configured to store a work requirement predefined with respect to a workpiece;
a recognition unit configured to recognize an environment of a working space in which the workpiece is placed, as a work environment;
a generation unit configured to generate a path of a robot placed in the working space to cause the robot to process the workpiece, based on the work requirement and the work environment; and
a control unit configured to control the robot based on the path.

(Appendix 2) The robot system according to appendix 1, wherein the generation unit is configured to generate the path based on the work requirement and the work environment, without using a teaching point with respect to the robot.

(Appendix 3) The robot system according to appendix 1 or 2, wherein
the work environment includes a position of the workpiece in the working space, and
the generation unit is configured to generate the path based on the position of the workpiece.

(Appendix 4) The robot system according to any one of appendices 1 to 3, wherein
the work requirement includes a processing target region on the workpiece to which processing by the robot is applied, and
the generation unit is configured to:
identify the processing target region of the workpiece placed in the working space, based on the work requirement and the work environment; and
generate the path based on a position of the identified processing target region.

(Appendix 5) The robot system according to appendix 4, wherein
the processing target region includes a relative position with respect to a workpiece model that is a model indicating the workpiece,
the recognition unit is configured to recognize a position and a posture of the workpiece placed in the working space, based on the workpiece model, and
the generation unit is configured to identify the processing target region in the working space, based on the position and posture of the workpiece, and the relative position.

(Appendix 6) The robot system according to appendix 4 or 5, wherein
the processing target region includes an approach point at which the robot approaches the workpiece, and the generation unit is configured to:

identify the approach point of the workpiece placed in the working space, based on the work requirement and the work environment; and generate, as at least part of the path, an air-cut path for moving the robot to the workpiece, based on a position of the identified approach point.

(Appendix 7) The robot system according to any one of appendices 1 to 6, further comprising a setting unit configured to set a processing order of a plurality of the workpieces, wherein the storage unit is configured to store the work requirement for each of the plurality of workpieces, the recognition unit is configured to recognize an environment of the working space in which the plurality of workpieces are placed, as the work environment, and the generation unit is configured to generate the path for causing the robot to process the plurality of workpieces in accordance with the processing order, based on the work requirement and the work environment.

(Appendix 8) The robot system according to appendix 7, wherein the setting unit is configured to dynamically and automatically set the processing order based on an arrangement of the plurality of workpieces in the recognized work environment.

(Appendix 9) The robot system according to appendix 7 or 8, wherein the plurality of workpieces includes a first workpiece and a second workpiece, and the generation unit is configured to generate, as at least part of the path, an air-cut path for moving the robot that has finished processing the first workpiece to the second workpiece.

(Appendix 10) The robot system according to any one of appendices 1 to 9, wherein the storage unit is configured to store an operational speed of the robot as the work requirement, and the generation unit is configured to generate the path further based on the operational speed.

(Appendix 11) The robot system according to any one of appendices 1 to 10, wherein the storage unit is configured to further store a force applied to the workpiece by the robot, as the work requirement, and the generation unit is configured to generate the path further based on the force.

(Appendix 12) The robot system according to any one of appendices 1 to 11, wherein the recognition unit is configured to recognize the work environment including an obstacle for the robot that is to process the workpiece, and the generation unit is configured to generate the path based on a position of the obstacle, such that the obstacle does not interfere with the robot.

(Appendix 13) The robot system according to appendix 12, wherein the storage unit is configured to further store an obstacle model that is a model of the obstacle, and the recognition unit is configured to recognize the work environment including the obstacle, based on the obstacle model.

(Appendix 14) The robot system according to any one of appendices 1 to 13, wherein the storage unit is configured to further store tool information on an end effector of the robot, and the generation unit is configured to generate the path of the end effector further based on the tool information.

(Appendix 15) The robot system according to any one of appendices 1 to 14, wherein the recognition unit is configured to recognize the work environment based on sensor data obtained from a sensor that monitors the working space.

(Appendix 16) The robot system according to any one of appendices 1 to 15, further comprising a definition unit configured to define the work requirement, based on a plurality of teaching points with respect to the robot, wherein the plurality of teaching points represents a process performed on the workpiece by the robot or another robot, and a position of the workpiece in a past working space in which the process has been performed, wherein the storage unit is configured to store the work requirement defined by the definition unit.

(Appendix 17) A planning system comprising:

a storage unit configured to store a work requirement predefined with respect to a workpiece;

a recognition unit configured to recognize an environment of a working space in which the workpiece is placed, as a work environment; and a generation unit configured to generate a path of a robot placed in the working space to cause the robot to process the workpiece, based on the work requirement and the work environment.

(Appendix 18) A robot control method executable by a robot system including at least one processor, the method comprising:

storing a work requirement predefined with respect to a workpiece;

recognizing an environment of a working space in which the workpiece is placed, as a work environment;

generating a path of a robot placed in the working space to cause the robot to process the workpiece, based on the work requirement and the work environment; and controlling the robot based on the path.

(Appendix 19) A planning program for causing a computer to execute:

retrieving a work requirement predefined with respect to a workpiece from a storage unit;

recognizing an environment of a working space in which the workpiece is placed, as a work environment; and generating a path of a robot placed in the working space to cause the robot to process the workpiece, based on the work requirement and the work environment.

What is claimed is:

1. A robot system comprising:

a storage device configured to store a predefined work requirement that indicates a processing target region of a workpiece to be processed by a robot, wherein the processing target region is a linear region along which the robot gives a physical change to the workpiece, wherein the linear region is defined on the workpiece, and wherein the processing target region includes an approach point at which the robot approaches the workpiece; and circuitry configured to:

recognize a work environment of a working space in which the workpiece is placed, wherein the work environment includes a position and a posture of the workpiece placed in the working space;

identify the processing target region of the workpiece placed in the working space, based on the position and posture of the workpiece placed in the working space;

identify the approach point of the workpiece placed in the working space, based on the work requirement and the work environment;

generate, in real-time, a work path of the robot to give the physical change to the workpiece along the linear region of the workpiece, based on the work requirement and the identified processing target region;

generate an air-cut path for moving the robot to the workpiece, based on a position of the identified approach point; and control the robot based on the generated work path and the generated air-cut path to cause the robot to move to the workpiece along the air-cut path and give the physical change to the workpiece along the work path, wherein the predefined work requirement is obtained from a past operation of the robot in a past process of the robot, wherein the robot has actually processed a past workpiece based on a plurality of teaching points in the past process, wherein the plurality of teaching points are obtained by past simulation, wherein the circuitry is configured to generate the work path and the air-cut path as a new path based on the position and the posture of the workpiece in the working space, without including the plurality of teaching points in the new path, and wherein the circuitry is configured to generate the work path along the identified processing target region, without correcting and using the plurality of teaching points.

2. The robot system according to claim 1, wherein the predefined work requirement is based, at least in part, on an operational speed of the robot in performing the past process, and wherein the new path includes a modification to the operational speed in real-time, based on the position and posture of the workpiece in the working space.

3. The robot system according to claim 1, wherein the predefined work requirement is based, at least in part, on a force applied by the robot to one or more workpieces in performing the past process, and wherein the new path includes a modification to the applied force in real-time, based on the position and posture of the workpiece in the working space.

4. The robot system according to claim 1, further comprising one or more sensors configured to monitor the position and posture of the workpiece in order to identify the processing target region of the workpiece in real-time.

5. The robot system according to claim 1, wherein the storage device is configured to store work requirements for a plurality of workpieces, and wherein the circuitry is configured to:
  detect the plurality of workpieces including the workpiece placed in the working space;
  set a processing order of the robot to process the plurality of the workpieces;
  recognize a spatial arrangement of the plurality of workpieces placed in the working space; and
  generate the work path and the air-cut path for causing the robot to process the plurality of workpieces in accordance with the processing order based, at least in part, on the spatial arrangement.

6. The robot system according to claim 5, wherein the circuitry is configured to:
  acquire a physical quantity related to a motion of the robot;
  calculate an evaluated value based on the physical quantity; and set the processing order in real-time based on the evaluated value.

7. The robot system according to claim 5, wherein the circuitry is configured to:
  detect a new workpiece in the working space; and
  set the processing order in real-time in response to detecting the new workpiece, wherein the robot processes the plurality of workpieces including the new workpiece in the processing order.

8. The robot system according to claim 5, wherein the plurality of workpieces includes a first workpiece and a second workpiece, and wherein the circuitry is configured to generate the air-cut path for moving the robot that has finished processing the first workpiece to the second workpiece.

9. The robot system according to claim 1, wherein the storage device is configured to store an operational speed of the robot, as the work requirement, and wherein the circuitry is configured to generate the work path and the air-cut path based on the operational speed.

10. The robot system according to claim 1, wherein the storage device is configured to store a pressing force generated when the robot presses the workpiece, as the work requirement, and wherein the circuitry is configured to generate the work path and the air-cut path based on the pressing force.

11. The robot system according to claim 1, wherein the storage device is configured to store an obstacle model, and wherein the circuitry is configured to:
  detect an obstacle placed in the working space based on the obstacle model; and
  generate the work path and the air-cut path such that the obstacle does not interfere with the robot.

12. The robot system according to claim 1, wherein the storage device is configured to store tool information on an end effector of the robot, and wherein the circuitry is configured to generate a path of the end effector, as the work path and the air-cut path, based on the stored tool information.

13. The robot system according to claim 1, wherein the circuitry is configured to recognize the work environment based on sensor data obtained from a sensor that monitors the working space.

14. The robot system according to claim 1, wherein the circuitry is configured to define the work requirement based on the plurality of teaching points obtained from the past process performed on one or more workpieces, and wherein the work path and the air-cut path are generated in real-time by comparing the position of the workpiece in the working space to a past working space in which the past process has been performed.

15. The robot system according to claim 14, wherein the work path and the air-cut path is generated in real-time without including the plurality of teaching points from the past process.

16. The robot system according to claim 1, wherein the circuitry is configured to:
  recognize the work environment in real-time in response to detecting that the workpiece is placed in the working space;
  generate the work path and the air-cut path in real-time in response to recognizing the work environment in real-time; and
  control the robot in real-time based on the work path and the air-cut path generated in real-time.

17. The robot system according to claim 1, wherein the processing target region is defined in a workpiece coordinate system that is a coordinate system whose origin is set to the workpiece, wherein the plurality of teaching points is set in a robot coordinate system that is a coordinate system whose origin is set to the robot, wherein the circuitry is configured to:

convert coordinate values indicating the processing target region included in the predefined work requirement obtained from the past operation of the robot, from the robot coordinate system to the workpiece coordinate system, to define the processing target region in the workpiece coordinate system;

store the predefined work requirement including the processing target region defined in the workpiece coordinate system into the storage device;

convert the coordinate values of the processing target region from the workpiece coordinate system to the robot coordinate system to identify the processing target region of the workpiece placed in the working space.

18. A robot control method executable by a robot system including at least one processor, the method comprising:

storing a predefined work requirement that indicates a processing target region of a workpiece to be processed by a robot, wherein the processing target region is a linear region along which the robot gives a physical change to the workpiece, wherein the linear region is defined on the workpiece, and wherein the processing target region includes an approach point at which the robot approaches the workpiece;

recognizing a work environment of a working space in which the workpiece is placed, wherein the work environment includes a position and a posture of the workpiece placed in the working space;

identifying the processing target region of the workpiece placed in the working space, based on the position and posture of the workpiece placed in the working space;

identifying the approach point of the workpiece placed in the working space, based on the work requirement and the work environment;

generating, in real-time, a work path of the robot to give the physical change to the workpiece along the linear region of the workpiece, based on the work requirement and the identified processing target region;

generating an air-cut path for moving the robot to the workpiece, based on a position of the identified approach point; and controlling the robot based on the generated work path and the generated air-cut path to cause the robot to move to the workpiece along the air-cut path and give the physical change to the workpiece along the work path, wherein the predefined work requirement is obtained from a past operation of the robot in a past process of the robot, wherein the robot has actually processed a past workpiece based on a plurality of teaching points in the past process, wherein the plurality of teaching points are obtained by past simulation, wherein the method further comprises generating the work path and the air-cut path as a new path based on the position and the posture of the workpiece in the working space, without including the plurality of teaching points in the new path, and wherein the method further comprises generating the work path along the identified processing target region, without correcting and using the plurality of teaching points.

19. A non-transitory computer-readable storage medium storing processor-executable instructions to:

retrieve a predefined work requirement that indicates a processing target region of a workpiece to be processed by a robot, from a storage device, wherein the processing target region is a linear region along which the robot gives a physical change to the workpiece, wherein the linear region is defined on the workpiece, and wherein the processing target region includes an approach point at which the robot approaches the workpiece;

recognize a work environment of a working space in which the workpiece is placed, wherein the work environment includes a position and a posture of the workpiece placed in the working space;

identify the processing target region of the workpiece placed in the working space, based on the position and posture of the workpiece placed in the working space;

identify the approach point of the workpiece placed in the working space, based on the work requirement and the work environment;

generate, in real-time, a work path of the robot to give the physical change to the workpiece along the linear region of the workpiece, based on the work requirement and the identified processing target region;

generate an air-cut path for moving the robot to the workpiece, based on a position of the identified approach point; and control the robot based on the generated work path and the generated air-cut path to cause the robot to move to the workpiece along the air-cut path and give the physical change to the workpiece along the work path, wherein the predefined work requirement is obtained from a past operation of the robot in a past process of the robot, wherein the robot has actually processed a past workpiece based on a plurality of teaching points in the past process, wherein the plurality of teaching points are obtained by past simulation, wherein the storage medium further stores a processor-executable instruction to generate the work path and the air-cut path as a new path based on the position and the posture of the workpiece in the working space, without including the plurality of teaching points in the new path, and wherein the storage medium further stores a processor-executable instruction to generate the work path along the identified processing target region, without correcting and using the plurality of teaching points.

20. The robot system according to claim 1, wherein the circuitry is configured to control the robot to cause the robot to give the physical change to the workpiece by at least one of polishing, welding, pressing and sealing.

* * * * *